June 24, 1958 — T. B. DILWORTH — 2,840,009
RAILWAY VEHICLE TRUCK
Filed Nov. 4, 1954 — 3 Sheets-Sheet 1

INVENTOR
Thomas B. Dilworth
BY S. C. Thorpe
ATTORNEY

June 24, 1958   T. B. DILWORTH   2,840,009
RAILWAY VEHICLE TRUCK

Filed Nov. 4, 1954   3 Sheets-Sheet 2

INVENTOR
Thomas B. Dilworth
BY
J. C. Thorpe
ATTORNEY

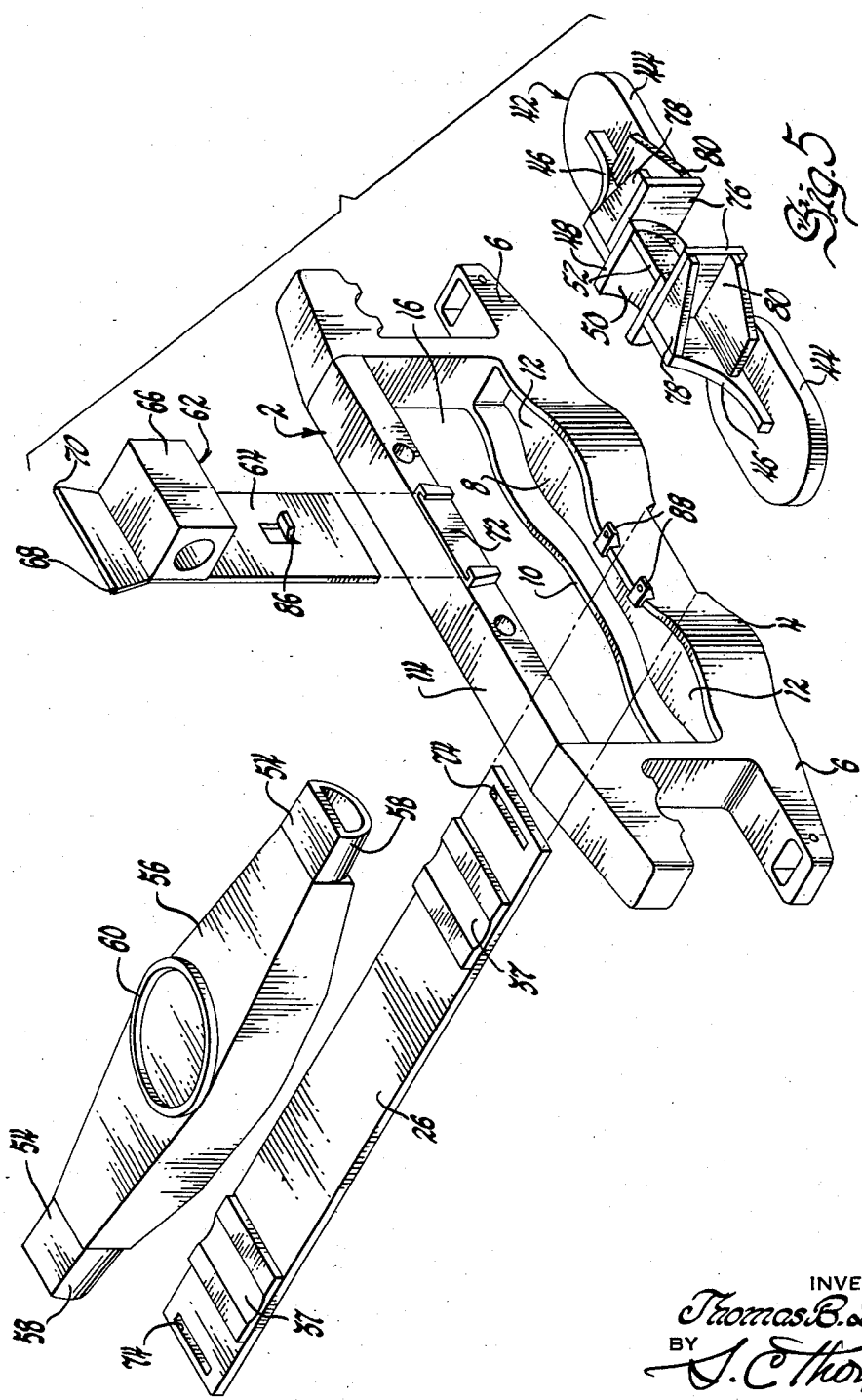

United States Patent Office 2,840,009
Patented June 24, 1958

2,840,009

RAILWAY VEHICLE TRUCK

Thomas B. Dilworth, Hinsdale, Ill., assignor to General Motors Corporation, Detroit, Mich., a corporation of Delaware Application November 4, 1954, Serial No. 466,829

4 Claims. (Cl. 105—198)

This invention relates generally to railway vehicle trucks and more particularly to a vehicle truck which is specially adapted for high speed freight and passenger service.

One of the objects of the present invention is to provide a truck which is quickly and easily serviced by arranging the various parts thereof so that they may be expeditiously disassembled and assembled.

It is a further object of this invention to improve the flexibility between the side frame members of the truck so as to better absorb the irregularities of railroad beds and thereby improve the riding qualities of the truck.

It is a still further object of this invention to pivotally or rotatably support the bolster to enable a more equalized distribution of the load applied thereto through the bolster springs.

It is another object of this invention to provide bolster end supporting means which are held in place by unique retaining means serving the additional function of carrying the damping means which damp relative movement of the bolster including the end supporting means relative to the rest of the truck frame.

It is another object of this invention to equalize the load between the side frame members by providing a flexible plate rigidly secured between the side frame members intermediate the ends thereof acting in combination with rods for partially supporting the brake rigging, the fastenings between plate and side frames being rigid enough to maintain tram between the side frame members yet flexible enough to permit a twisting action between the side frames to thereby improve the riding qualities of the truck.

For a fuller understanding of these and other objects of this invention reference may be had to the accompanying detailed description and drawings, in which:

Fig. 1 is a plan view of the truck with parts broken away and in section to illustrate various of the unique features thereof;

Fig. 5 is an exploded view in perspective of certain elements of the truck illustrating their configuration and how they are assembled together.

Figure 2:
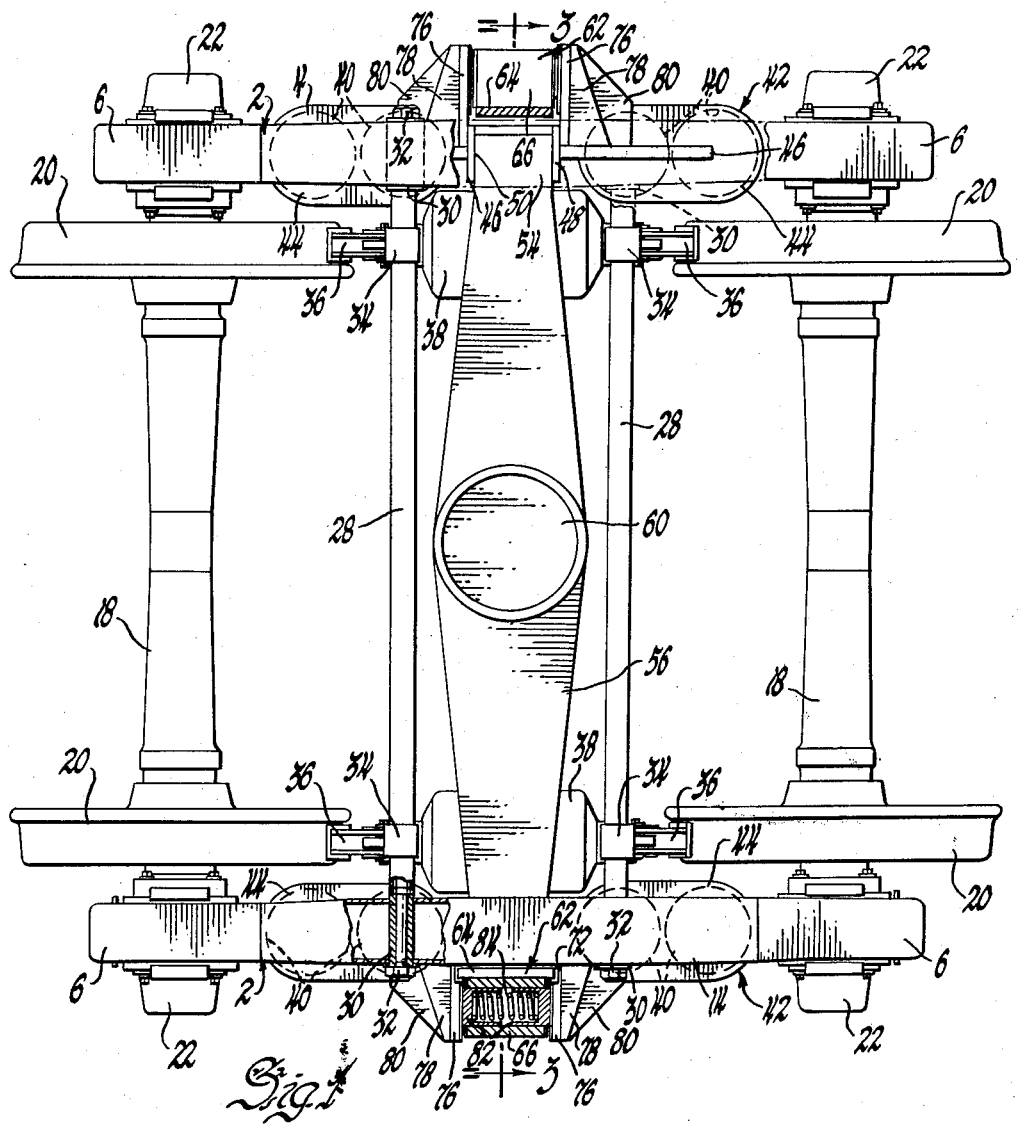
Fig. 2 is a side view in elevation of the truck and serves as a good illustration of the unique means which are used to limit lateral movement of the bolster and supporting means and how this means is retained by the truck side frames.
Figure 2:
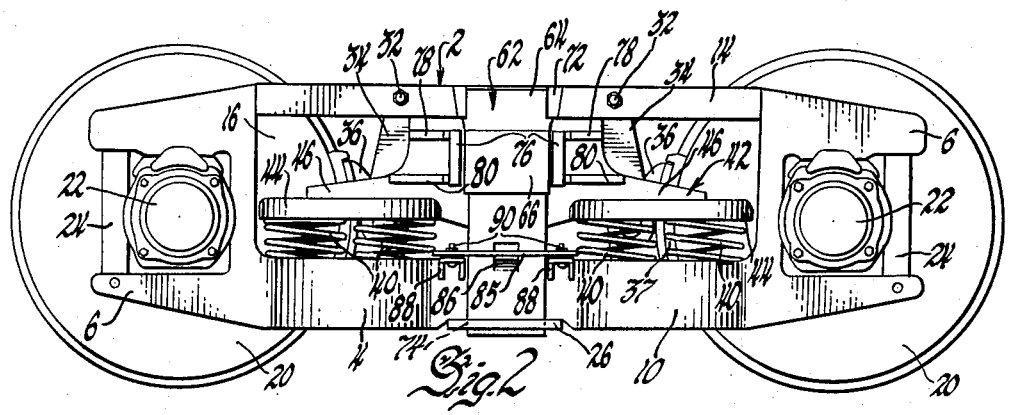

Referring now to the accompanying drawings, the truck is made up of two transversely spaced longitudinally extending side frame members indicated by the numeral 2. Each of these side frame members includes a lower tension member 4 having opposite longitudinally extending horizontal pedestal ends 6 formed on either end thereof. The tension member 4 includes a bottom plate 8 and a pair of side plates 10 which together form a pair of upwardly facing longitudinally spaced spring pockets or seats 12. Interposed between the upper portions of the oppositely disposed pedestal ends 6 and in alignment therewith is a longitudinally extending compression member 14 which in combination with the lower tension member 4 and the pedestal ends 6 forms a bolster assembly opening or window 16. Partially aiding in the maintenance of tram between the two side frame members 2 are a pair of wheel and axle sets each including an axle 18 and a set of oppositely disposed wheels 20. The ends of each axle 18 are journaled for rotation in the usual journal box assemblies indicated by numerals 22. Each of these journal box assemblies 22 is received between the upper and lower portions of an associated pedestal end 6 and maintained therein by means of a securing bar 24. As already mentioned, with this arrangement the wheel and axle sets aid in maintaining tram between the side frame members 2. The pedestal ends extend horizontally instead of vertically as in the usual case so that it is unnecessary to lift the truck side frames in order to remove a wheel and axle assembly. This feature expedites the changing out of a wheel and axle assembly since it is only necessary to support the particular end of the truck by suitable means and remove the securing bars 24.

Also aiding in the maintenance of tram between the two side frame assemblies 2 is a flexible plate 26 which is rigidly secured to the undersides of the tension members 4 intermediate the ends thereof and adjacent the ends of the flexible plate or member 26. This plate is rigid enough to maintain tram between the side frame members yet flexible enough to permit a twisting or rotating action between the two side frames so as to provide the truck with sufficient flexibility whereby it more satisfactorily absorbs the irregularities occurring in the usual railroad bed. Also tending to maintain tram between the two side frame members 2 are a pair of transversely extending rods 28 located above and longitudinally spaced on either side of the flexible member or plate 26. The rods 28 are threaded at the ends thereof and extend through bushings 30 provided in the side frame members 2. To secure the side frames and the rods 28 so that they will not move laterally relative to each other nuts 32 have been provided which are turned on the threaded ends of the rods 28. As seen in Fig. 1 the rods 28 tend to reduce the amount of flexible action that would be allowed between the two side frame members 2 if the flexible tie plate 26 were acting alone. However, a certain amount of flexibility is still provided due to the flexibleness of the rods 28 and also the manner in which they are secured in the side frames 2.

It will be observed that the rods 28 not only aid in the maintenance of tram between the side frame members 2 while at the same time providing a certain amount of flexibility therebetween but also serve as supports from which pairs of oppositely disposed transversely spaced vertical brake levers 34 are pivotally suspended at the upper ends thereof. Pivotally attached to the levers 34 intermediate the ends thereof are brake shoe assemblies 36. Slidably supported on pads 37 on the flexible tie plate 26 immediately inboard the tension members 4 of the side frame members 2 are a pair of brake cylinder assemblies 38. Each of the brake cylinder assemblies 38 has its operating ends operatively connected to the lower ends of a pair of the longitudinally spaced brake levers 34 so that upon actuation of the assemblies 38 the levers 34 will pivot in opposite directions about the bars 28 causing engagement between brake shoe assemblies 36 and the wheels 20. It will thus be observed that the flexible tie plate 26 and the flexible rods 28 actually serve a three-fold purpose. First, they maintain tram between the side frame member 2; second, they allow a certain amount of flexible twisting action therebetween; and, third, they serve as the supporting means for the brake rigging of the railway vehicle truck.

Each side frame member 2 has resiliently supported in a window 16 thereof by means of sets of longitudinally and widely spaced helical coil springs 40 seated in the spring seats 12 a bolster end supporting means indicated generally by the numeral 42. The upper ends of the springs 40 engage downwardly facing longitudinally spaced spring seats 44 of the assembly 42. Secured to the upper sides of the seats 44 are a pair of vertical plates 46 between which is secured a bolster end support 48 having an upwardly facing concave cylindrical bearing surface 50. One end of the cylindrical recess formed in the bolster end support 48 is closed by means of a wall 52. Rotatably supported in the concave portions of the bolster end supports 48 are the ends 54 of a railway vehicle truck bolster 56. It will be observed that each end 54 is provided with a lower convex cylindrical surface 58 which acts as a rotatable bearing surface enabling the bolster 56 to rotate in the bolster end supports 48 relative to the bolster end supporting means 42. This feature represents a substantial improvement from the standpoint of improving the riding qualities of the truck because the bolster 56, due to the relatively large area of its center bearing recess 60 is maintained substantially parallel to the underside of the railway vehicle body at all times. Under such conditions, unless the truck frame or conversely the truck bolster can move or rotate relative to the other, the irregularities in the railroad bed cannot be absorbed as they should be and unequal loads tend to be placed on the springs 42. As already emphasized the present invention overcomes this disadvantage by having the bolster rotatable relative to the side frame members. This rotatable feature of the truck bolster is believed to be novel and to represent a substantial improvement over other trucks of this type. The wide spacing of springs 40 in pockets 12 materially increases the longitudinal stability of the bolster 56 and assemblies 42 on side frame members 2.

Figure 3:
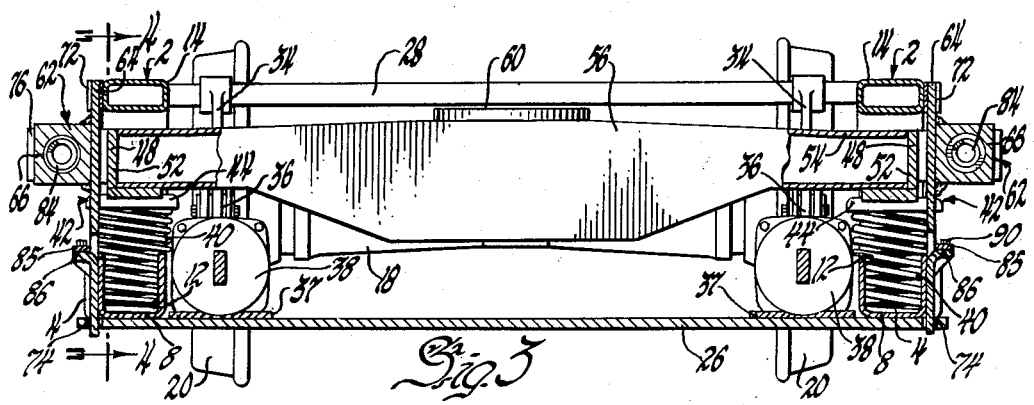
Fig. 3 is an end view in elevation taken at the center of the truck on the line 3—3 of Fig. 1 with portions broken away and in section to particularly illustrate the unique damping means.
Figure 4:
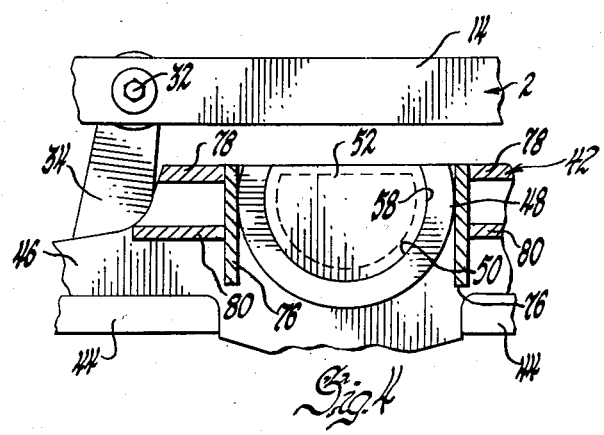
Fig. 4 is a fragmentary view taken on the line 4—4 of Fig. 3 and serves primarily to illustrate how the bolster ends are partially cylindrical in shape and received in cylindrical pockets in the bolster end supporting means so that the bolster may rotate with respect thereto.

A novel means for retaining the bolster 56 and the bolster end supporting means 42 so as to limit the lateral movement thereof with respect to the side frame members 2 has been provided and is indicated generally by a numeral 62. This means comprises a flat plate 64 to which is affixed a large abutting or chafing block 66. The plate 64 is flared as at 68 and 70 at the upper end thereof and is guided into place by means of guide means 72 secured to the compression members 14 of the side frame members 2. The lower ends of the plates 64 reside in slots 74 in the ends of the flexible tie plate 26. Downward movement of the plates 64 into the slots 74 and the guides 72 is limited by the flared portions 68 cooperating with the guides 72. When in place it may be seen, particularly from Figs. 2 and 3, that the large abutting or chafing blocks 66 are located between sets of vertical longitudinal center-facing oppositely disposed chafing plates 76 provided on the outboard sides of the bolster end supporting means 42 and reinforcedly attached to the plates 46 by means of gusset plates 78 and 80. With this arrangement it will be observed that there is a certain amount of lateral clearance between the walls 52 and the back or inboard sides of the plates 64 which allows the bolster 56 and the bolster end supporting means 42 to swing laterally until the walls 52 abut the back or inboard sides of the plates 64. This limited lateral movement of the bolster 56 is considered desirable since it has been found to substantially improve the riding qualities of this type of truck. In order to damp this lateral movement as well as vertical movement which must necessarily take place between the bolster end supporting means 42 and the side frame members 2 friction damping means have been provided in the abutting or chafing blocks 66. These friction damping means are best shown in Fig. 1 and constitute in each abutting block 66 a pair of oppositely acting plungers 82 which are biased apart by means of a helical coil spring 84 interposed therebetween. The ends of the plungers 82 engage the chafing plates 76 to thereby damp vertical and lateral movement of the bolster and the bolster end supporting means with respect to the side frame members 2.

In order to prevent the removal of the means 62 from the guides 72 and slots 74 a tab 86 has been provided on plate 64. This tab and the plate 64 to which it is attached is anchored by means of a pair of lugs 88 secured to the compression member of the side frame members 2. A small strap 85 is located over the tab 86 and is bolted to the lugs 88 by means of bolt and nut assemblies 90.

From the foregoing it may be appreciated that the means 62 in combination with other elements of the truck is a multi-purpose item. It serves to limit lateral movement of the bolster and the bolster end supporting means with respect to the side frame members 2. It maintains the bolster assembly, including the bolster 56 and the bolster end supporting means 42, assembled. It acts as the means for transmitting longitudinal movement between bolster and frame. It provides a quickly reached location for mounting the bolster damping means. The mere removal of these assemblies 62 leaves the remaining portion of the truck in condition so that it may be quickly disassembled. It also enables the bolster damping means to be quickly removed and replaced.

I claim:

1. In a railway vehicle truck, a side frame member having a window therein, a bolster end support resiliently supported on said side frame in the window thereof for lateral movement therein, a bolster end rotatably supported by said support, and abutting means on said frame and said bolster end support to limit lateral movement of said bolster end and bolster end support relative to said side frame member.

2. In a railway vehicle truck comprising a pair of transversely spaced longitudinally extending side frame members having aligned windows therein, transversely extending wheel and axle sets extending between and supporting said side frame members, a transversely extending flexible member secured to each of said side frames intermediate the ends thereof, the ends of said flexible member extending outboard of said side frame members and having slots therein, a bolster supporting piece for each of said side frame members resiliently supported in the window thereof, a transversely extending truck bolster rotatably supported by said bolster supporting pieces, sets of longitudinally spaced oppositely disposed longitudinal center-facing chafing plates on each of said bolster supporting pieces, guide means on the outboard side of each of said side frame members in general vertical alignment with said slots, means cooperating with said chafing plates to transmit longitudinal movement between said bolster and said side frame members comprising a pair of plates removably retained in said slots and said guides having affixed thereto abutting members which are interposed between and engageable with said sets of chafing plates, and oppositely acting spring-loaded plungers supported by said last-mentioned members and acting against said sets of chafing plates to damp movement of said bolster supporting pieces relative to said side frame members.

3. A railway vehicle truck comprising a pair of transversely spaced longitudinally extending side frame members having aligned windows therein, transversely extending wheel and axle sets extending between and supporting said side frame members, a transversely extending flexible member secured to each of said side frames intermediate the ends thereof, the ends of said flexible member extending outboard of said side frame members and having slots therein, a bolster supporting piece for each of said side frame members resiliently supported in the window thereof, a transversely extending truck bolster rotatably supported by said bolster supporting pieces, sets of longitudinally spaced oppositely disposed longitudinal center-facing chafing plates on each of said bolster supporting pieces, guide means on the outboard side of each of said side frame members in general vertical alignment with said slots, and means cooperating with said chafing plates to transmit longitudinal movement between said bolster and said side frame members comprising a pair of plates removably retained in said slots and said guides having affixed thereto abutting members which are interposed between and engageable with said sets of chafing plates.

4. In a railway vehicle truck including a pair of oppositely disposed longitudinally extending side frame members each having a window therein, a truck bolster support piece for each of said side frame members resiliently supported thereon in the window thereof for lateral swinging movement relative thereto, a truck bolster whose opposite ends extend into said windows and are rotatably supported by said bolster support pieces, and means to damp movement of said support pieces in said windows.

References Cited in the file of this patent

UNITED STATES PATENTS

| | | |
|---|---|---|
| 664,312 | Carnahan | Dec. 18, 1900 |
| 941,515 | Goodspeed | Nov. 30, 1909 |
| 1,020,960 | Bettendorf | Mar. 26, 1912 |
| 1,130,665 | Bullock | Mar. 2, 1915 |
| 1,712,747 | Clasen | May 14, 1929 |
| 1,788,874 | Kadel | Jan. 13, 1931 |
| 1,997,662 | Suckfield | Apr. 16, 1935 |
| 2,133,530 | Beutlich | Oct. 18, 1938 |
| 2,169,960 | Cottrell | Aug. 15, 1939 |